No. 874,841. PATENTED DEC. 24, 1907.
W. GARDINER.
STORAGE BATTERY PLATE.
APPLICATION FILED APR. 26, 1906.
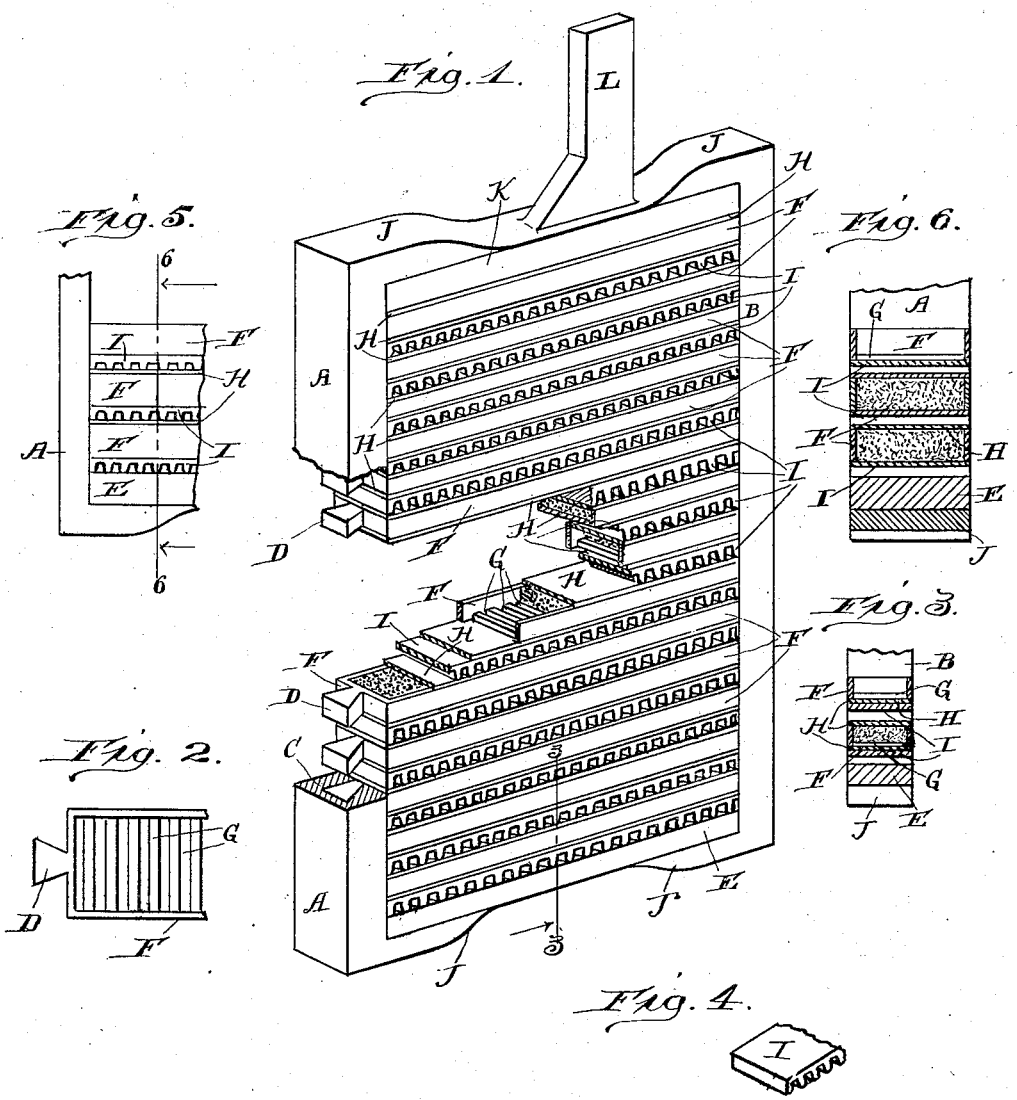
Witnesses:
Chas. E. Gorton
John M. Haas
Inventor:
William Gardiner,
Edward F. Wilson
By _____ Atty

UNITED STATES PATENT OFFICE.

WILLIAM GARDINER, OF CHICAGO, ILLINOIS, ASSIGNOR, BY MESNE ASSIGNMENTS, TO COMMERCIAL STORAGE BATTERY CO., OF CHICAGO, ILLINOIS, A CORPORATION OF ILLINOIS.

STORAGE-BATTERY PLATE.

No. 874,841.  Specification of Letters Patent.  Patented Dec. 24, 1907.

Application filed April 26, 1906. Serial No. 313,778.

*To all whom it may concern:*

Be it known that I, WILLIAM GARDINER, a citizen of the United States, residing at Chicago, in the county of Cook and State of Illinois, have invented certain new and useful Improvements in Storage-Battery Plates; and I hereby declare the following to be a full, clear, and exact description of the invention, such as will enable others skilled in the art to which it appertains to make and use the same.

My invention relates to a novel construction in a storage battery plate, the object being to provide a device of this character in which the active material is exposed indirectly to the action of the liquid over a very large surface and from which the liberated or generated gases are readily expelled, and consists in the features of construction and combinations of parts hereinafter fully described and claimed.

In the accompanying drawings: Figure 1 is a view in perspective partly in section of a storage battery plate constructed in accordance with my invention. Fig. 2 is a fragmentary top plan view of one of the cross bars or retainers for the active material employed in the device. Fig. 3 is a detail fragmentary transverse section on the line 3 3 of Fig. 1. Fig. 4 is a fragmentary detail perspective view of one of the separating members disposed between the retainers for the active material. Fig. 5 is a fragmentary detail side elevation on an enlarged scale showing a slightly modified form of construction. Fig. 6 is a fragmentary detail transverse section on the line 6 6 of Fig. 5.

My said invention comprises a storage battery plate consisting of two side bars A and B of lead which are cast in a mold in which the component parts of the battery plate are held, the said bars thus receiving the dovetail projections D at the ends of a solid bar E of lead and of intermediate retaining members hereinafter specified, said side bars A and B being thus firmly held in proper relative position by the said bar E and retaining members, and serving at the same time to retain the latter in proper relative position. At intervals in said frame are disposed oblong receptacles F of lead, to hold lead oxid or other suitable active material, the bottom of each tray being provided with small regularly spaced lateral slots G through which the liquid surrounding said plate finds its way into contact with the active material contained in said receptacle. Above and below each of said receptacles F is disposed a thin strip H of an absorbent material such as paper, felt, or the like, and between the strips H which are disposed above and below two of the adjacent receptacles F is disposed what I will term a toothed-rack I of any suitable material such, for instance, as wood, paper, or the like, the recesses between the teeth of said racks serving to permit more ready contact of the liquid with the active material employed in the device. It is not essential that the absorbent material should be interposed between the plane face of the rack I, and the lower face of the receptacle F, as the rack may be placed in direct contact with the bottom of said receptacle F as shown in Figs. 5 and 6. Any corrugated surface may be substituted for the toothed-face of said rack I and such corrugated surface is disposed downwardly to bear upon the strip H and resting upon the upper face of the receptacle F and permit the free flow of the contained active material, so that gases liberated or generated through the action of the liquid upon the active material, and finding its way through said upper strip H, will be readily liberated and thus prevent the formation of gas bubbles which have a tendency to protect the surface of the active material against the action of the liquid.

In assembling a storage battery plate made in accordance with my invention, the solid bar E is first taken and upon it is placed a rack I, then follows a strip H, a receptacle F, another strip H, another rack I, and so on until enough active material has been introduced. A top bar K similar to the bar E but provided with the terminal projection L, is then placed in position and pressure is applied thereto to hold the assembled parts firmly in position. The partly formed plate is then placed in a suitable mold and the side bars A and B are cast in position surrounding the dovetailed projections D. Said side bars A and B have cast upon their ends inwardly extending projections J adapted to engage the outer surfaces of said end bars E and K, and thus prevent the expanding of the assembled parts when the pressure is removed.

In storage batteries the greatest trouble usually encountered is that the bubbles or globules of gas generated or liberated by the action of the liquid on the active material generally adhere to the surface of said active material and thus protect the same against the action of said liquid. This obviously greatly reduces the active area and is, therefore, very disadvantageous. In the construction herein described the bubbles of generated or liberated gas can find no lodgment on the active surface, and consequently will force their way through the porous layers disposed above and below the receptacles F. Hence they cannot interfere with the action of the liquid on such active material and can therefore do no harm. Such bubbles will, however, readily escape through the recesses between the teeth of the racks I, and thus find their way out of the battery.

I claim as my invention:

1. A storage battery plate comprising a frame, a plurality of receptacles having spaced transverse bars constituting bottom supports of the same, a plurality of dividing members having spaced transverse ribs, and sheets of absorbent material interposed between said receptacles and rigid plates.

2. A storage-battery plate comprising a bar, a spacing-member mounted on said bar, a receptacle having a transversely slotted bottom and adapted to contain active material, and mounted on said spacing member, an absorbent sheet mounted between each of said receptacles and said spacing-members, and a frame cast integral with each of said members after the same have been assembled, substantially as described.

In testimony whereof I have signed my name in presence of two subscribing witnesses.

WILLIAM GARDINER.

Witnesses:
  E. F. WILSON,
  JOHN M. HAAS.